2,987,670
Patented June 6, 1961

2,987,670
METHOD OF DETERMINING THE EFFICIENCY OF CUTTING FLUIDS
Norwin C. Derby, Wappingers Falls, N.Y., assignor to Texaco Inc., a corporation of Delaware
No Drawing. Filed Mar. 5, 1958, Ser. No. 719,193
3 Claims. (Cl. 324—65)

This invention relates to a method of measuring the efficiency of cutting fluids.

In orthogonal metal cutting operations, for example, in the turning of metals such as steel and alloys of various metals, cutting is performed by directing the cutting edge of a tool against the surface of the metal thereby removing portions called chips. Since there is a great amount of work done in the formation of the chip from the metal work piece by the tool, and of friction occurring at the tool face, much heat is developed. To aid in the cutting process, cutting fluids of various compositions are employed primarily both as coolants and as lubricants. This invention concerns a method of measuring the efficiency of these cutting fluids.

In the formation of the chip during the cutting operation, it is compressed in length so that the length of the chip does not equal the length of the cut from which the chip is taken while the volume of both the chip and the cut remains, for this purpose, constant. The work done in shearing the metal per unit volume removed in orthogonal cutting operations can be determined to a great degree by a mathematical formula. This formula and an explanation of the terms used therein have been set forth by Dr. M. E. Merchant in an article entitled "Metal Cutting Research-Theory and Application," published by the American Society for Metals in the book entitled "Machining—Theory and Practice." It can be shown from this formula that as the efficiency of a metal cutting process increases, the length of the chip approaches the length of the cut made by the tool and the longer a chip is with the same width and volume, the more efficient the cutting process.

Two chips of the same metal stock, having the same cross-sectional areas and lengths, have the same electrical resistance measured from end to end. If the length is decreased and the volume and width of the chip remain constant, the electrical resistance will decrease. Therefore, the relative electrical resistance of chips may be used as a measure of the relative length of chips. It follows that the electrical resistance of chips of equal volume and width is a measure of the efficiency of the metal cutting process, and, all other things being equal, of the efficiency of the cutting fluid used.

Thus, the method of determining the efficiency of cutting fluids used in orthogonal metal cutting operations in accordance with the present invention comprises first cutting a metal piece in said metal cutting operation to form a chip, then cutting said metal piece for a distance equal to and in the same manner as said first cutting to form another chip while utilizing a cutting fluid of which it is desired to measure the efficiency, measuring the electrical resistance of said first cut chip, and measuring the electrical resistance of the other cut chip.

This method is particularly applicable to metal turning wherein the tool is directed against the rotating metal stock to remove chips. The metal stock or billet is slotted or scored longitudinally along its surface for a depth about equal to one fourth the cut of the tool so that a chip may be obtained from a cut of known length, said length being equal to the circumference of the billet or more particularly to the distance between two consecutive cracks caused by slotting the billet.

The mathematical formula previously referred to as capable of use in determining the work done in shearing the metal per unit volume removed, $W_s$, is as follows. This formula does not include any built-up edge effect as a factor.

$$W_s = S_s \epsilon$$

where $S_s$ is equal to the main shear stress at the shear plane or the mean strength of the metal being removed.
$\epsilon$ = shearing strain undergone by metal in chips during the process of its removal. The mathematical representation of this is as follows:

$$\epsilon = \cot d + \tan(d-a)$$

where $d$ equals the shear angle and $a$ equals the rake angle of the tool as measured in a plane perpendicular to its cutting edge.

In the latter equation, the following can be substituted for $\tan d$:

$$\tan d = \frac{r_c \cos a}{1 - r_c \sin a}$$

where $r_c$ equals the cutting ratio of the depth of the cut $t_1$ to the thickness of the chip $t_2$.

The only unknown factor in the above equations is the thickness of the chip $t_2$ which is very difficult to determine because of the very rough and irregular thickness dimension of the chip. However, it can be shown that where two chips have equal volumes V, and equal widths $w$; $t_1 l_1 w = V = t_2 l_2 w$ and therefore $$\frac{t_1}{t_2} = \frac{l_2}{l_1}$$

This relation being true, $r_e$ can be substituted for $r_c$ in the above equation; where $r_e$ is equal to the ratio of the length of a chip $l_2$ to the length of the cut $l_1$. The length of the cut $l_1$ can be easily determined by measurement. However, the chip is curled to a degree making it impossible to take a measurement of its length $l_2$.

As previously stated, the initial equation shows that as the efficiency of a metal cutting process increases, the length of the chip $l_2$ approaches the length of the cut $l_1$ and the longer the chip is with the same width and volume the more efficient the process. Therefore, by measuring the electrical resistance of the chip from end to end a function of the length $l_2$ is found which can be used as an indication of the efficiency of the cutting fluid employed in the cutting operation.

The following is a description of the actual test method and apparatus used:

*Details of apparatus*

The lathe employed for this test was The American Machine Tool Company's Pacemaker, a 16 inch by 30 inch tool room metal cutting lathe.

The test tool was a Rex AA high speed steel blank measuring 3/8 inch by 3/8 inch by 3 inches in length and supplied by Crucible Steel Co. The tool blank met the following specifications:

Tungsten, percent _____ 18.00
Chromium, percent _____ 4.00
Vanadium, percent _____ 1.10
Carbon, percent _____ 0.73
Hardness, Rockwell _____ C–63

The cutting head of the tool was 5/16 of an inch in length. The side vertical face of the cutting head, forming one facet of the cutting edge, was a minimum of 5/16 of an inch in height and was ground at a 4° angle starting from the cutting edge. The top horizontal face of the cutting head, which formed the other facet of the cutting edge, was ground at an 8° angle starting from the cutting edge. The end vertical face of the cutting head was ground at a 4° angle starting from the top horizontal edge and at a 4° angle starting from the front vertical edge of the cutting head. This vertical edge was initially rounded to a radius of 0.010 of an inch. The three ground faces of the tool had a maximum surface roughness of two (2) microinches root-mean-square as measured with a Brush Surface Analyzer.

The metal stock or billet to be cut in the lathe was vanadium deoxidized steel, stock C-45, furnished by the Bethlehem Steel Co. The billet was 8-8½ inches in diameter as received but was reduced to 7½ inches for testing. The ladle analysis of the steel used for this billet was as follows:

| | |
|---|---|
| Carbon, percent | 0.48 |
| Manganese, percent | 0.89 |
| Phosphorous, percent | 0.010 |
| Sulfur, percent | 0.027 |
| Silicon, percent | 0.25 |
| Vanadium, percent | 0.16 |
| Tensile strength | 87,000 lbs./sq. in. |
| Yield point | 50,000 lbs./sq. in. |
| Binell hardness | 163-174 |

*Details of procedure*

As previously indicated, the billet was slotted or scored longitudinally to a depth of about one-fourth the depth of the intended test cutting depth. A scoring tool made from the same type blank previously described and having a cutting head ground down to ⅛ inch in length, ¼ inch in height and ¹⁄₁₆ inch in width was used. The cutting edge was along the ¹⁄₁₆ inch width and the front face was ground at an 8° angle starting from the cutting edge.

This slotting tool was mounted in the tool post of the lathe with its center line in the same horizontal plane as the centerline of the billet but perpendicular thereto. The slotting tool was oriented with the cutting edge tangential to the cylindrical billet. With the billet locked, the cutting tool was traversed longitudinally along the billet using the hand travel crank of the lathe apron. A number of passes were made taking only a few thousandths of an inch on each pass until a depth of ¹⁄₃₂ of an inch was reached.

After slotting the billet, the slotting tool was removed and the test cutting tool was mounted in the tool post with the cutting edge of the tool at the center line of the billet perpendicular to and with the end of the tool 0.150 of an inch beyond the face of the billet at the starting end thereof. The lathe feed was adjusted to give a feed of 0.002 of an inch per revolution of the billet. Therefore, for each revolution a volume of metal 0.002 of an inch thick, 0.150 of an inch wide and equal in length to the circumference of the billet was removed.

The cutting speed of the lathe was set at 180 surface feet per minute and the cutting oil flow was at the rate of 4 gallons per minute.

With a freshly ground tool a ten second cut was made under the above conditions and the chips thrown away. Then, another ten second cut was made for the test. This cut was terminated by stopping the lathe leaving the chip attached to the billet. The chip was broken off and starting at that end the chip was examined until the first crack caused by the slot was found. The end portion was removed and the next ten segments designated by the cracks spaced along the chip were saved for resistance measurement.

The ten segments were separated into individual chips and then washed in Stoddard solvent and etched in oxalic acid to assure good electrical contact. Their electrical resistance was then measured on a standard Wheatstone bridge modified only by the addition of small clamps to contact and hold the end of the chips.

Two more ten second cuts as described above were made using the same tool. The same procedure, of four ten second cuts, was then followed for each of two other new cutting tools. This resulted in a total of ninety chips which were measured for electrical resistance. These ninety electrical resistance measurements were subsequently averaged to obtain the rating of the cutting oil.

The efficacy of the test procedure of this invention was demonstrated using three commercial cutting fluids, the field performances of which were well known.

Cutting fluid A was a sulfurized dark cutting oil comprising a refined paraffin base oil and additive amounts of sulfurized fatty oil and powdered sulfur. This cutting oil had a viscosity at 100° F. of between 160-170 SUS.

Cutting fluid B was a sulfurized transparent cutting oil comprising a refined paraffin base oil and minor amounts of a sulfur containing additive and powdered sulfur. The viscosity of this cutting oil at 100° F. was also between 160 and 170 SUS.

Cutting fluid C was a non-corrosive transparent cutting oil comprising a refined paraffin base oil and a minor amount of a chlorine containing additive. No active sulfur was present in this oil which had a viscosity at 100° F. of between 155 and 165 SUS. Each of the runs in the following table are the results of four (4) ten second cuts using one tool as previously described.

TABLE

| Cutting Fluid | Runs | | | | | Resistance, Milliohms—Average Value |
|---|---|---|---|---|---|---|
| | 1 | 2 | 3 | 4 | 5 | |
| A | 74 | 77 | 87 | 75 | 83 | 79 |
| B | 69 | 68 | 68 | 78 | 70 | 71 |
| C | 64 | 66 | 60 | 67 | 66 | 65 |
| Dry | 47 | 47 | 45 | 47 | 44 | 46 |

The lower the resistance as measured in milliohms in the above table, the less effective is the cutting fluid. The average values obtained above rate the cutting fluids in the order indicated by field experience and have a reasonable amount of discrimination between them. The data in the above table also indicate the obvious advantage of using a cutting fluid over cutting with no fluid or dry.

Obviously, many modifications and variations of the invention, as hereinbefore set forth, may be made without departing from the spirit and scope thereof, and, therefore, only such limitations should be imposed as are indicated in the appended claims.

I claim:

1. In the method for determining the efficiency of a cutting fluid used in metal turning, the steps comprising first cutting a revolving metal piece in a metal turning operation to form a first cut chip, utilizing a cutting fluid of known efficiency during said first cutting, then cutting said revolving metal piece a second time for a distance equal to and in the same manner as said first cutting to form a second cut chip, utilizing a cutting fluid of unknown efficiency during the second cutting of said metal piece, measuring the electrical resistance of said first cut chip, and measuring the electrical resistance of said second cut chip, whereby the efficiency of a cutting fluid can be determined.

2. In a method for determining the efficiency of a cutting fluid used in metal turning, the steps comprising, longitudinally slotting a cylindrical metal piece, first cutting said cylindrical metal piece in a metal turning operation to form a first chip, utilizing a cutting fluid of known efficiency during said first cutting, again cutting said metal piece in the same manner as in said first cutting to form a second chip, utilizing a cutting fluid of unknown efficiency during the second cutting of said metal piece, measuring the electrical resistance of a length of said first chip defined by the distance between two consecutive slots, and measuring the electrical resistance of a length of said second chip defined by the distance between two consecutive slots, from which measurings of electrical resistances the efficiency of said cutting fluid of unknown efficiency can be determined.

3. A method for determining the efficiency of a cutting fluid used in metal turning which comprises first cutting a revolving metal piece in a metal turning operation to form a first chip from a cut of known length, utilizing a cutting fluid of known efficiency during said first cutting, then replacing said cutting fluid of known efficiency with a cutting fluid of unknown efficiency, second cutting said revolving metal piece in the same manner as in said first cutting to form a second chip from a cut equal in length to that of said first cutting, measuring the electrical resistance of said first chip, and measuring the electrical resistance of said second chip, from which measurings of electrical resistances, the efficiency of a cutting fluid can be determined.

References Cited in the file of this patent

UNITED STATES PATENTS

| | | |
|---|---|---|
| 1,176,291 | Herbert et al. | Mar. 21, 1916 |
| 1,397,541 | Owens | Nov. 22, 1921 |
| 2,275,443 | Kraus | Mar. 10, 1942 |

FOREIGN PATENTS

| | | |
|---|---|---|
| 457,191 | Canada | June 7, 1949 |

OTHER REFERENCES

Moulin et al.: "Measurements of Cutting Force and Industrial Applications," Microtecnic vol. V, No. 4, July-August 1951, pp. 179–189.

Ernst et al.: "Radioactive Cutting Tools for Rapid Tool-Life Testing," Transactions of the ASME, May 1953, pp. 549–559.